United States Patent [19]

Engle

[11] 4,084,858
[45] Apr. 18, 1978

[54] UNCOUPLING VALVE WITH OVERRIDE FEATURE

[75] Inventor: Thomas H. Engle, Cape Vincent, N.Y.

[73] Assignee: General Signal Corporation, Rochester, N.Y.

[21] Appl. No.: 783,037

[22] Filed: Mar. 30, 1977

[51] Int. Cl.² ............................................. B60T 7/12
[52] U.S. Cl. ...................................... 303/18; 303/86; 303/81; 303/42
[58] Field of Search ................. 251/14, 63, 5, 149.6; 303/6 R, 6 A, 6 M, 7, 9, 13, 18, 40, 42, 81, 82, 86

[56] References Cited
U.S. PATENT DOCUMENTS

| | | | |
|---|---|---|---|
| 2,367,575 | 1/1945 | Good | 303/18 |
| 3,285,672 | 11/1966 | Avrea | 303/9 |

*Primary Examiner*—Stephen G. Kunin
*Attorney, Agent, or Firm*—Pollock, Vande Sande & Priddy

[57] ABSTRACT

An uncoupling valve for use in rail car brake systems having a pressurized supervisory pipe includes opposed piston motors which hold the valve open long enough to depressurize the supervisory pipe and cause an emergency brake application, when two cars are uncoupled accidentally. On the other hand, the valve includes a controlled source of pressure for overpressurizing one of the piston motors to hold the valve closed to prevent depressurization of the supervisory pipe, when two cars uncoupled intentionally.

7 Claims, 2 Drawing Figures

UNCOUPLING VALVE WITH OVERRIDE FEATURE

BACKGROUND OF THE INVENTION

In rail car brake systems which are controlled by the pressure in a brake pipe or supervisory pipe which extends through the train, it has long been the practice to configure the system to apply the brakes when this pipe is broken or otherwise depressurized due, say, to accidental uncoupling. When however it is desired to intentionally uncouple two adjacent cars, the system should also permit uncoupling without a depressurization of the pipe and its attendant brake application. Various schemes have been devised for performing these two functions; but usually they have been unnecessarily complex or unreliable in use.

OBJECTS OF THE INVENTION

An object of this invention is to provide an uncoupling which will ensure depressurization of the supervisory pipe following accidental uncoupling, but which includes means for overriding its depressurization function following intentional uncoupling.

Another object of the invention is to provide such a valve which is simple in construction and reliable in operation.

A further object of the invention is to provide such a valve which is responsive to pneumatic pressures for its actuation.

Yet another object of the invention is to provide such a valve which will remain open long enough following accidental uncoupling to ensure sufficient depressurization of the supervisory pipe to apply the emergency brakes of a rail car.

These objects are given only by way of example. Thus, other desirable objects and advantages inherently achieved by the disclosed invention may occur to those skilled in the art. Nonetheless, the scope of the invention is to be limited only by the appended claims.

SUMMARY OF THE INVENTION

The above objects and other desirable advantages are achieved by the disclosed invention which is particularly adapted for use in combination with a rail car brake system of the type having a supervisory, pneumatically pressurized pipe for controlling braking operations. An improved coupler valve circuit is provided for interconnecting the supervisory pipes in adjacent rail cars which includes a valve for establishing communication between supervisory pipes of adjacent cars when two adjacent cars are coupled and for closing communication between the supervisory pipe of each car and atmosphere when two adjacent cars are uncoupled. A control piston is provided for holding the valve open momentarily to depressurize the supervisory pipe to atmosphere when two adjacent cars are accidentally uncoupled. Also, a device for overriding the effect of the control piston to prevent depressurization of the supervisory pipe when two adjacent cars are intentionally uncoupled.

More particularly, the coupler valve circuit comprises a valve body which is adapted to be attached to the supervisory pipe, the valve body including a bore having a valve seat therein. A valve carrier is mounted for translation within the bore, the carrier having a valve element positioned to contact the valve seat to prevent flow from the supervisory pipe through the valve bore. An extension of the valve carrier contacts a like extension in an adjacent car to hold the valve element away from the valve seat when two cars are coupled. A differential piston attached to the valve carrier for translation with it in the bore defines a first chamber on one side of the piston and a second chamber on the other side of the piston. Means are provided for pressurizing both of the chambers to the pressure in the supervisory pipe when two adjacent cars are coupled. When two cars are uncoupled, one of the chambers depressurizes more rapidly than the other to momentarily hold the valve out of contact with its valve seat so that the supervisory pipe depressurizes when two adjacent cars are accidentally uncoupled. To prevent depressurization of the supervisory pipe when cars are intentionally uncoupled, means are also provided for selectively pressurizing the other of the chambers to force the valve element into contact with its valve seat.

DETAILED DESCRIPTION OF THE PREFERRED EMBODIMENT

Figure 1:
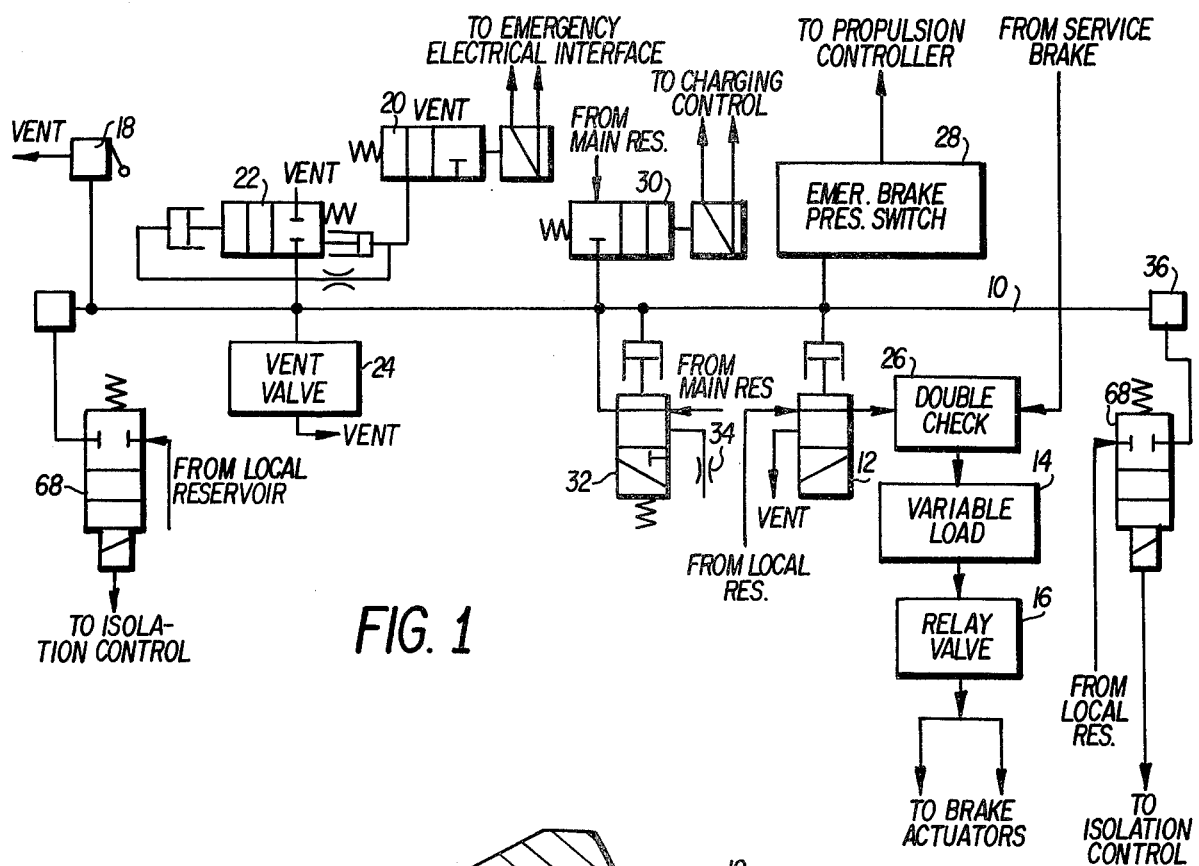
FIG. 1 shows a schematic view of a portion of a rail car brake system indicating the components for providing emergency brake application in relation to the uncoupling valve of the present invention.

There follows a detailed description of the preferred embodiment of the invention, reference being had to the drawings in which like reference numerals identify like elements of structure in each of the several figures.

FIG. 1 shows a schematic diagram of an emergency brake system for rapid transit rail cars which is a supervisory pipe type system. The components for a single car are shown. A supervisory pipe 10 is included which serves dual functions. In normal operation, pipe 10 is connected to the main reservoir (not shown) on each car in the train to permit equalization of air demand from car to car by providing air to a car with a malfunctioning compressor or with an unusually heavy air demand. In emergency situations, venting of supervisory pipe 10 will operate an emergency brake application valve 12 which supplies pressure to the brake cylinders (not shown) through a variable load valve 14 and a relay valve 16, independent of all other systems and devices on the car. As shown in FIG. 1, all components of the emergency brake system are all tied closely to supervisory pipe 10. Additional emergency brake application features are an emergency manual valve 18, and an emergency magnet valve 20. De-energization of emergency magnet valve 20 by any of several electrical devices located on the car (not shown) pilots a brake application valve 22 and cause rapid venting of supervisory pipe 10.

A vent valve 24 is also provided which is sensitive to the rate of change of supervisory pipe pressure. Rapid downward fluctuation of the supervisory pipe pressure of even a few pounds per square inch will cause vent valve 24 to open a large capacity passage to atmosphere. This produces a corresponding pressure drop on an adjacent car, thereby causing its vent valve to operate in similar fashion. In this manner, car to car pneumatic propagation of an emergency brake application is achieved following initiation of any car in the train. Vent valve 24 is of known design and is so constructed that once it has been vented, it will remain open for an extended period of, say, 35 seconds, which will cause the car to be brought irretrievably to a stop. When the supervisory pipe pressure fails below a preselected limit of, say, 50 pounds per square inch, emergency valve 12 is operated to supply air via a double check valve 26 to variable load valve 14 and relay valve 16. Relay valve 16 duplicates the pressure from load valve 14 at higher flow rates in the known manner. The output of relay valve 16 passes to the brake actuators (not shown) to apply the brakes. Finally, an emergency brake pressure switch 28 is also provided to produce a signal when supervisory pipe pressure is below normal. This intelligence is used by the propulsion system to cut off propulsion power during an emergency brake application.

As mentioned, supervisory pipe 10 normally serves the purpose of equalizing main reservoir pressure from car to car. This function achieved by a reset magnet valve 30 and a reset and cutoff valve 32. After an emergency brake application has occurred, and the extended timing period of vent valve 24 has ended, assuming all venting devices have been closed, supervisory pipe 10 will be at atmospheric pressure. Normal supervisory pipe pressure is restored by operating reset magnet valve 30. This action will initially charge supervisory pipe 10 at a low rate; but when the pipe reaches a pressure of, say, 50 pounds per square inch, reset and cutoff valve 32 will shift to its illustrated alternate position, thereby connecting the main reservoir to supervisory pipe 10 and providing for rapid charging. It is necessary for the operator to hold reset magnet valve 30 open until the desired setting is reached because the reset and cutoff valve 32, in its illustrated cutoff position, vents supervisory pipe 10 to atmosphere through a small choke 34. The capacity of reset magnet valve 30 is chosen to be much higher than the capacity of choke 34 so that supervisory pipe 10 will charge, despite the presence of choke 34. This small venting choke 34 is necessary to prevent inadvertent buildup of supervisory pipe pressure which could result in unintentional release of the brakes. When the supervisory pipe pressure reaches the desired setting, emergency valve 12 shifts to its illustrated alternate position to vent air from the emergency brake side of double check valve 26. If there is no pressure on the service brake side of valve 26, the brake cylinder pressure will be released.

Figure 2:
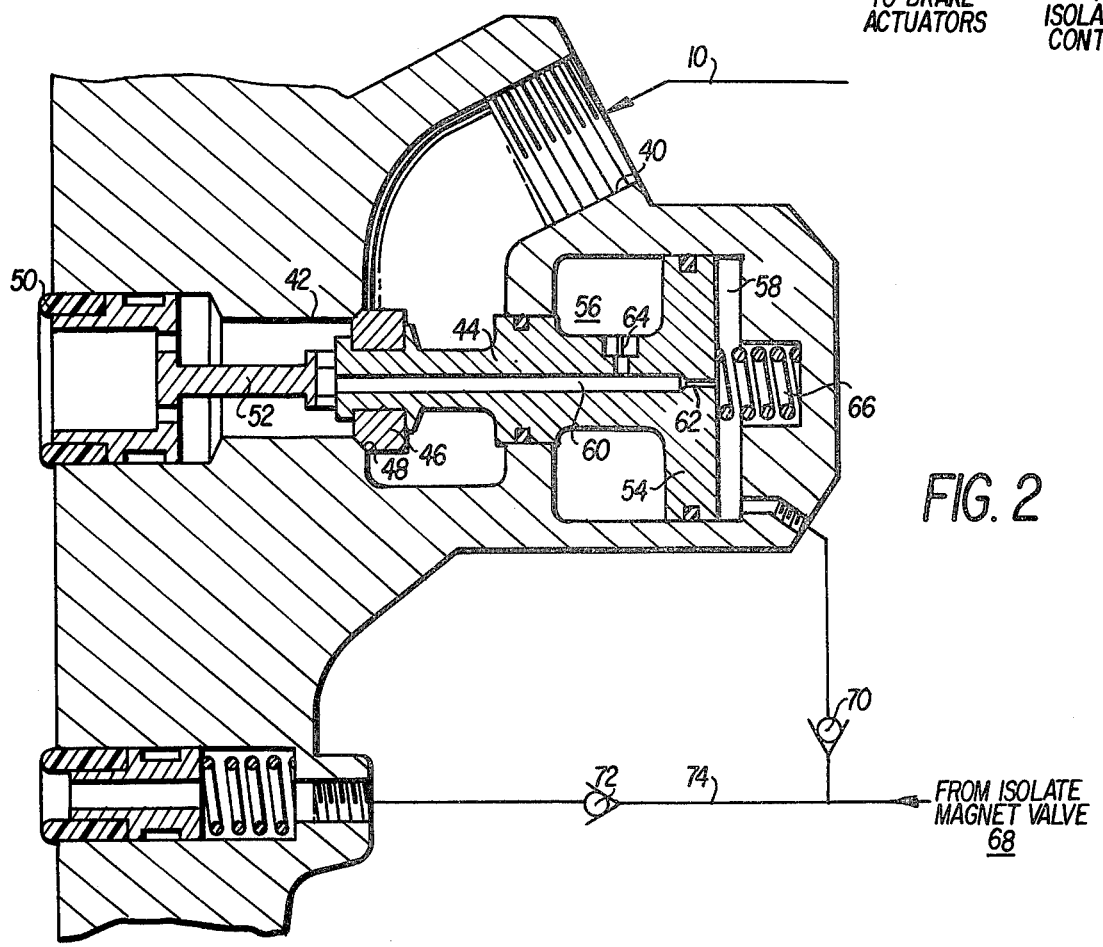
FIG. 2 shows a fragmentary, sectional view through an uncoupling valve according to the present invention.

As mentioned, unintentional train parting should cause an emergency brake application. This function is provided in the uncoupling valve 36 according to the invention, one of which is provided at each end of supervisory pipe 10 in each car of the trains. The details of valve 36 are shown in FIG. 2.

Valve 36 comprises a valve body 38 having a threaded opening 40 attached to supervisory pipe 10. A stepped bore 42 slidably receives a valve carrier 44 having a valve element 46 thereon in position to coact with a valve seat 48 located in bore 42. The position of uncoupling valve 36 is controlled by movement of a seal 50 mounted on an extension 52 of valve carrier 44. When cars are coupled, the seals 50 in adjacent cars are pressed into bore 42, thereby pushing valve element 46 away from valve seat 48. The position of valve 36 is also controlled by a differential control piston 54 attached to valve carrier 44. Piston 54 has two chambers 56 and 58 both of which communicate by means of a central passage 60 through carrier 44 and piston 54. Passage 60 communicates with the portion of bore 42 between valve seat 48 and seal 50. Thus, when the cars part, central passage 60 will be vented to atmosphere.

Chambers 56 and 58 initially are charged to supervisory pipe pressure when two cars are coupled and valve 36 is open; but when the cars part and central passage 60 is vented to atmosphere, pressure in chamber 58 reduces to atmospheric almost immediately, through a large orifice 62. On the other hand, pressure in chamber 56 reduces much more slowly through a small orifice 64, so that chamber 56 takes, say, 2 seconds to reduce to atmospheric. The differential depressurization of chambers 56 and 58 sets up an unbalanced force on the control piston 54 which holds valve element 46 away from seat 48 against the pressure of a return spring 66 located in chamber 58. This permits a rapid drop in supervisory pipe pressure which is sensed by vent valve 24 to produce an emergency application on the train following accidental separation of the cars. Orifices 62 and 64 could also be located in housing 38, so long as they communicate with bore 42 between seat 48 and seal 50.

When the cars are intentionally parted, an isolate magnet valve 68 (FIG. 1) is selectively energized by the operation to introduce pressurized air from a local reservoir (not shown), into chamber 58 at a rate greater than the discharge rate through orifice 62. Thus, control piston 54 will follow seal 50 as it moves out of bore 42 during the parting of the cars so that valve element 46 will contact seat 48 and prevent supervisory pipe pressure from dropping. After valve element 46 contacts seat 48, the pressure in chamber 56 will continue to reduce through choke 64 until it reaches atmospheric. After this, isolate magnet valve 68 may be de-energized, which will permit the air pressure in chamber 58 to dissipate to atmosphere; however, the valve element 46 will remain in contact with seat 48 because of the influence of return spring 66. Air flowing from isolate magnet valve 68 reaches chamber 58 via a check valve 70 and also flows to the adjacent car via a check valve 72 located in line 74. When the cars part, line 74 is vented to atmosphere; however, the flow rate through isolate magnet valve 68 is selected to be adequate to pressurize chamber 58 sufficiently to override the pressure in chamber 56 and ensure closure of valve 36.

Having described my invention in sufficient detail to enable those skilled in the art to make and use it, I claim:

1. In combination with a rail car brake system having a supervisory pneumatically pressurized pipe for controlling braking operations, an improved coupler valve circuit for interconnecting supervisory pipes in adjacent rail cars, said valve circuit comprising:

a valve body adapted to be attached to said supervisory pipe;

a bore in said valve body communicating with said supervisory pipe, said bore having a valve seat therein;

a valve carrier mounted for translation in said bore, said carrier having a valve element adapted to contact said valve seat to prevent flow of fluid from said supervisory pipe through said bore;

extension means attached to said valve carrier for contacting a like extension means in an adjacent car and for holding said valve element away from said valve seat when two cars are coupled;

piston means attached to said valve carrier for translation therewith in said bore, said bore defining a first chamber on one side of said piston and a second chamber on the other side of said piston;

means for pressurizing both said first and second chambers to the pressure in said supervisory pipe when said valve element is out of contact with said valve seat;

means for permitting one of said first and second chambers to depressurize more rapidly then the other to momentarily hold said valve element out of contact with said valve seat, whereby said supervisory pipe depressurizes when two adjacent cars are accidentally uncoupled; and means for selectively pressurizing the other of said first and second chambers to force said valve element into contact with said valve seat, whereby said supervisory pipe remains pressurized when two adjacent cars are intentionally uncoupled.

2. The combination of claim 1, further comprising return spring means for biasing said valve element into contact with said valve seat.

3. The combination of claim 2, wherein said return spring means is located in said one of said first and second chambers.

4. The combination of claim 1, wherein said means for pressurizing comprises a bore extending through said valve carrier, said bore communicating with said first and second chambers.

5. The combination of claim 1, wherein said means for permitting comprises a first exhaust orifice in the wall of said one of said first and second chambers and a second exhaust orifice in said other of said first and second chamber, said first exhaust orifice being smaller than said second orifice.

6. The combination of claim 1, wherein said means for selectively pressurizing comprises a source of fluid pressure, a control valve and conduit means for conveying fluid from said source to said other of said first and second chambers via said control valve.

7. In combination with a rail car brake system having supervisory pneumatically pressurized pipe for controlling brake operations, an improved coupler valve circuit for interconnecting supervisory pipes in adjacent rail cars, said valve circuit comprising:

valve means for establishing communication between supervisory pipes of adjacent cars when two adjacent cars are coupled and for closing communication between said supervisory pipe of each car and atmosphere when two adjacent cars are uncoupled;

means for holding said valve means open momentarily, whereby said supervisory pipe is vented to atmosphere, when two adjacent cars are accidentally uncoupled;

means for overriding said means for holding, whereby said supervisory pipe is not vented to atmosphere, when two adjacent cars are intentionally uncoupled.

* * * * *